(12) United States Patent
Addis et al.

(10) Patent No.: US 9,943,932 B2
(45) Date of Patent: Apr. 17, 2018

(54) TRUNNION HOLE REPAIR METHOD UTILIZING INTERFERENCE FIT INSERTS

(71) Applicant: United Technologies Corporation, Farmington, CT (US)

(72) Inventors: Mark E. Addis, Kennebunk, ME (US); George H. Reynolds, Sanford, ME (US)

(73) Assignee: United Technologies Corporation, Farmington, CT (US)

( * ) Notice: Subject to any disclaimer, the term of this patent is extended or adjusted under 35 U.S.C. 154(b) by 69 days.

(21) Appl. No.: 15/131,235

(22) Filed: Apr. 18, 2016

(65) Prior Publication Data

US 2016/0221130 A1 Aug. 4, 2016

Related U.S. Application Data

(62) Division of application No. 12/082,229, filed on Apr. 9, 2008, now Pat. No. 9,404,374.

(51) Int. Cl.
*B23P 6/00* (2006.01)
*B23P 11/02* (2006.01)
(Continued)

(52) U.S. Cl.
CPC ........... *B23P 6/005* (2013.01); *B23P 6/002* (2013.01); *B23P 11/02* (2013.01); *B23P 11/025* (2013.01); *F01D 9/042* (2013.01); *F01D 17/14* (2013.01); *F01D 17/162* (2013.01); *F04D 29/545* (2013.01); *F04D 29/563* (2013.01); *F04D 29/644* (2013.01); *F05D 2220/32* (2013.01); *F05D 2230/80* (2013.01);

(Continued)

(58) Field of Classification Search
CPC .......... B23P 6/002; B23P 6/005; B23P 11/02; Y10T 29/49318; Y10T 29/49726; Y10T 29/49735; Y10T 29/49739; Y10T 29/49865; Y10T 29/49872; Y10T 403/48; F05D 2230/80; F16B 4/006
See application file for complete search history.

(56) References Cited

U.S. PATENT DOCUMENTS 2,699,345 A 1/1955 Bales
3,788,763 A 1/1974 Nickles
(Continued)

FOREIGN PATENT DOCUMENTS

EP 1400659 A1 3/2004
EP 1717450 A2 11/2006
EP 1959094 A2 8/2008

OTHER PUBLICATIONS

Extended European Search Report, European Patent Application No. 09250938.9, dated Mar. 30, 2012, 10 pages.
(Continued)

*Primary Examiner* — Jermie Cozart
(74) *Attorney, Agent, or Firm* — Kinney & Lange, P.A.

(57) ABSTRACT

The present application discloses a method for repairing a damaged counterbore in a variable vane shroud. A layer of base material is removed from the vane shroud adjacent the counterbore such that a damaged portion of the counterbore is removed. A shrink-fit insert having a size slightly larger than that corresponding to the layer of base material removed from the shroud is placed into the area of removed material such that the counterbore is restored to pre-damaged dimensions upon installation of the shrink-fit insert.

16 Claims, 7 Drawing Sheets

(51) Int. Cl.
*F01D 9/04* (2006.01)
*F01D 17/16* (2006.01)
*F04D 29/56* (2006.01)
*F04D 29/64* (2006.01)
*F01D 17/14* (2006.01)
*F04D 29/54* (2006.01)

(52) U.S. Cl.
CPC ...... *F05D 2240/14* (2013.01); *F05D 2260/74* (2013.01); *Y10T 29/49318* (2015.01); *Y10T 29/49726* (2015.01); *Y10T 29/49735* (2015.01); *Y10T 29/49737* (2015.01); *Y10T 29/49739* (2015.01); *Y10T 29/49865* (2015.01)

(56) References Cited

U.S. PATENT DOCUMENTS

| | | |
|---|---|---|
| 3,999,883 A | 12/1976 | Nordenson |
| 4,808,069 A | 2/1989 | Bonner et al. |
| 4,834,613 A | 5/1989 | Hansen et al. |
| 4,856,962 A | 8/1989 | McDow |
| 5,039,277 A | 8/1991 | Naudet |
| 5,421,703 A | 6/1995 | Payling |
| 5,569,018 A | 10/1996 | Mannava et al. |
| 6,370,752 B1 | 4/2002 | Anderson et al. |
| 6,682,299 B2 | 1/2004 | Bowen et al. |
| 7,112,039 B2 | 9/2006 | Brooks |
| 7,717,670 B2 | 5/2010 | Foucher |
| 7,722,318 B2 | 5/2010 | Addis |
| 2004/0081554 A1 | 4/2004 | Bruce |
| 2004/0120618 A1 | 6/2004 | Bruce et al. |
| 2005/0031238 A1 | 2/2005 | Bruce et al. |
| 2005/0084190 A1 | 4/2005 | Brooks et al. |
| 2005/0232757 A1 | 10/2005 | Bruce et al. |
| 2006/0029494 A1 | 2/2006 | Bruce et al. |

OTHER PUBLICATIONS

Communication Pursuant to Article 94(3) EPC, dated Oct. 18, 2017, 6 Pages.

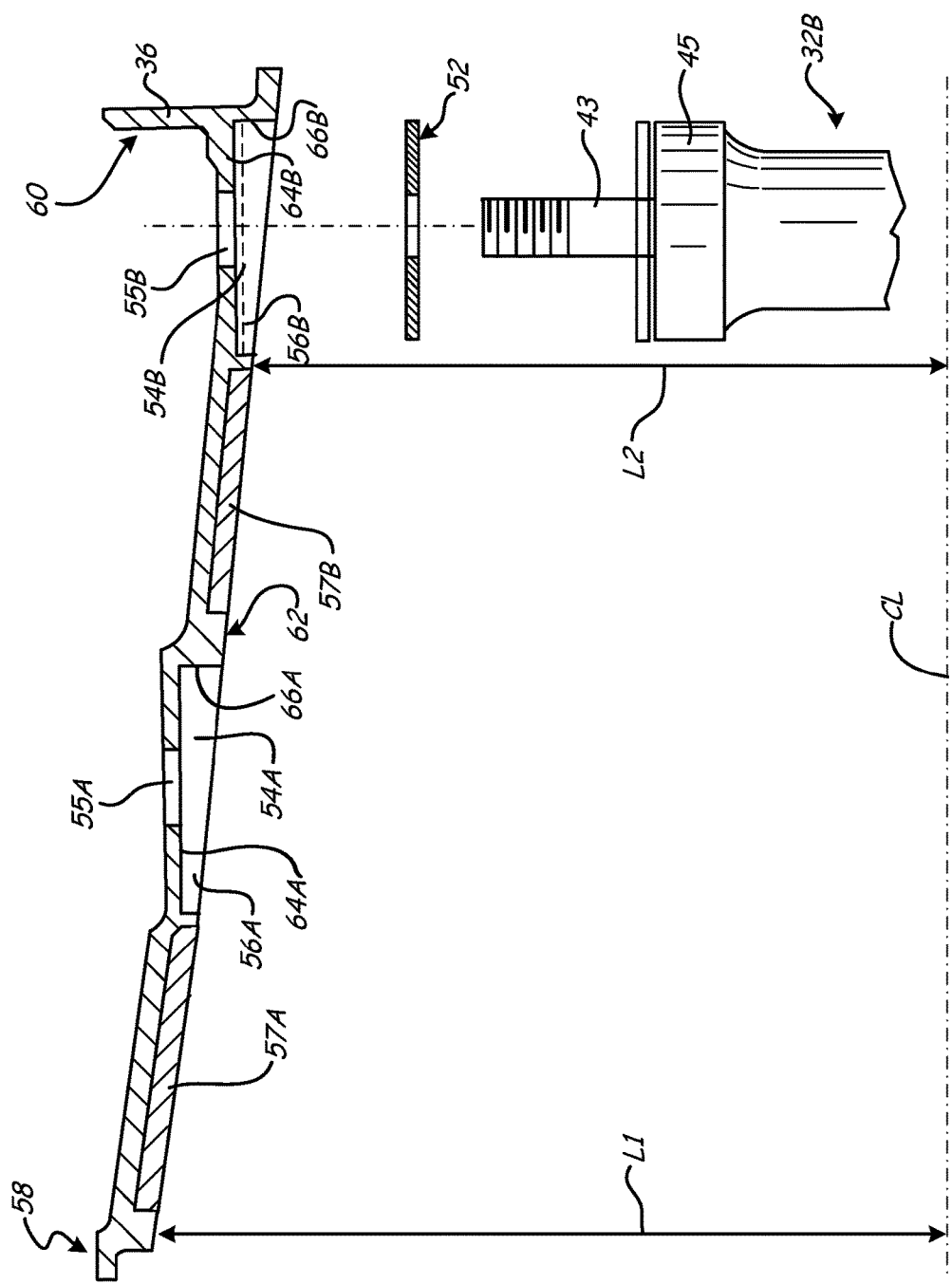

TRUNNION HOLE REPAIR METHOD UTILIZING INTERFERENCE FIT INSERTS

CROSS-REFERENCE TO RELATED APPLICATION(S)

This divisional application claims priority from application Ser. No. 12/082,229, filed Apr. 9, 2008, now U.S. Pat. No. 9,404,374 B2 entitled TRUNNION HOLE REPAIR UTILIZING INTERFERENCE FIT INSERTS, which is hereby incorporated by reference.

BACKGROUND

The present invention is related to gas turbine engines, and in particular to variable vane counterbored holes for engine casings.

Gas turbine engines operate by combusting fuel in compressed air to create heated gases with increased pressure and density. The heated gases are ultimately forced through an exhaust nozzle, which is used to step up the velocity of the exiting gases and in-turn produce thrust for driving an aircraft. In turbofan engines the heated gases are used to drive a turbine for rotating a fan to produce thrust, and to drive a turbine for driving a compressor that provides the compressed air used during combustion. The compressor section of a gas turbine engine typically comprises a series of rotor blade and stator vane stages. At each stage, rotating blades push air past the stationary vanes. Each rotor/stator stage increases the pressure and density of the air. Stators convert the kinetic energy of the air into pressure, and they redirect the trajectory of the air coming off the rotors for flow into the next compressor stage.

The speed range of an aircraft powered by a gas turbine engine is directly related to the level of air pressure generated in the compressor section. For different aircraft speeds, the velocity of the airflow through the gas turbine engine varies. Thus, the incidence of the air onto rotor blades of subsequent compressor stages differs at different aircraft speeds. One way of achieving more efficient performance of the gas turbine engine over the entire speed range, especially at high speed/high pressure ranges, is to use variable stator vanes which can optimize the incidence of the airflow onto subsequent compressor stage blades.

A plurality of variable stator vanes are typically circumferentially arranged between outer and inner diameter shrouds, which are typically manufactured from steel alloys. The vanes typically include trunnion posts at their innermost and outermost diameters that extend through counterbored holes in the shrouds, respectively. Accordingly, it is desirable that the variable vanes have low-friction rotational movement within the counterbores. However, over the course of an engine lifetime, these counterbores become worn and weathered. In addition to normal vane-induced wear, operation in wet and/or salt-rich environments induces corrosion or pitting in the counterbores, which interferes with free rotation of the vane trunnions within the counterbores. In the case of severe wear or corrosion, it can be necessary to replace the entire compressor case or vane shroud in order to restore optimal free rotation to the variable vanes. This is undesirable because these parts are typically very costly due to the high-grade alloys and precision manufacturing necessary to produce these parts. Thus, there is a need for improved methods and systems for reducing or eliminating the effects of wear and corrosion on variable vane counterbored holes.

One repair directed toward a vane shroud for a gas turbine engine is disclosed in HOLE LINERS FOR REPAIR OF VANE COUNTERBORE HOLES, Mark E. Addis, application Ser. No. 11/706,674 filed on Feb. 13, 2007. A liner having a shape corresponding to a layer of material removed from the shroud is inserted into the void left by removing damaged material such that the counterbore is restored to pre-damaged dimensions. This method requires the use of specially shaped inserts that are bonded into the hole, as well as complex removal of material to accommodate the insert.

What is needed is a simpler, more cost effective manner to repair such damaged holes.

SUMMARY

The present application discloses a method for repairing a damaged counterbore in a variable vane shroud. A layer of base material is removed from the vane shroud adjacent the counterbore such that a damaged portion of the counterbore is removed. A shrink-fit insert having a size slightly larger than that corresponding to the layer of base material removed from the shroud is placed into the area of removed material such that the counterbore is restored to pre-damaged dimensions upon installation of the shrink-fit insert.

In an alternate embodiment, a method for repairing a damaged variable vane shroud is disclosed. A layer of base material is removed from the vane shroud adjacent a counterbore such that a damaged portion of the counterbore is removed. The counterbore is then measured. A shrink-fit insert based on the measurements of the amount of removed material is created and supercooled. The supercooled shrink-fit insert is installed adjacent the vane shroud, returning the vane shroud to its design parameters.

BRIEF DESCRIPTION OF THE DRAWINGS

FIG. 5 shows cross section 5-5 of FIG. 3 showing the insertion of a shrink-fit variable vane hole insert into an HPC front case counterbore.

DETAILED DESCRIPTION

Figure 1:
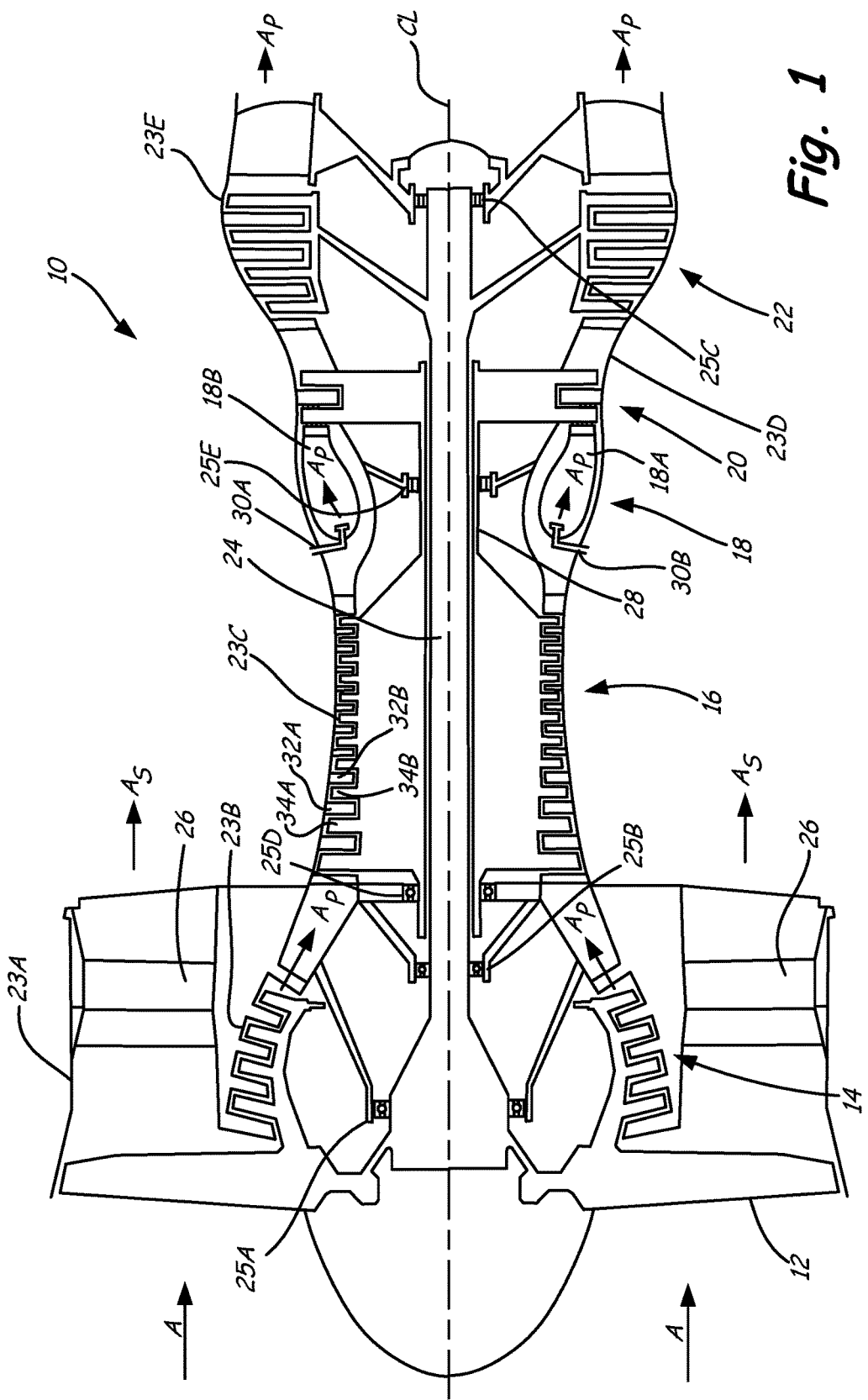
FIG. 1 shows a schematic of a gas turbine engine in which the shrink-fit variable vane hole inserts of the present invention are used.

FIG. 1 shows gas turbine engine 10, in which shrink-fit variable vane hole inserts can be used. Gas turbine engine 10 comprises a dual-spool turbofan engine having variable stator vanes for which the advantages of the hole inserts are particularly well illustrated. Gas turbine engine 10 comprises fan 12, low pressure compressor (LPC) 14, high pressure compressor (HPC) 16, combustor section 18, high pressure turbine (HPT) 20 and low pressure turbine (LPT)

22, which are each concentrically disposed around longitudinal engine centerline CL. Fan 12 is enclosed at its outer diameter within fan case 23A. Likewise, the other engine components are correspondingly enclosed at their outer diameters within various engine casings, including LPC case 23B, HPC case 23C, HPT case 23D and LPT case 23E such that an air flow path is formed around centerline CL.

Inlet air A enters engine 10 and it is divided into streams of primary air $A_P$ and secondary air $A_S$ after it passes through fan 12. Fan 12 is rotated by low pressure turbine 22 through shaft 24 to accelerate secondary air $A_S$ (also known as bypass air) through exit guide vanes 26, thereby producing a major portion of the thrust output of engine 10. Shaft 24 is supported within engine 10 at ball bearing 25A, ball bearing 25B and roller bearing 25C. Primary air $A_P$ (also known as gas path air) is directed first into low pressure compressor (LPC) 14 and then into high pressure compressor (HPC) 16. LPC 14 and HPC 16 work together to incrementally step up the pressure of primary air A. HPC 16 is rotated by HPT 20 through shaft 28 to provide compressed air to combustor section 18. Shaft 28 is supported within engine 10 at ball bearing 25D and roller bearing 25E. The compressed air is delivered to combustors 18A and 18B, along with fuel through injectors 30A and 30B, such that a combustion process can be carried out to produce the high energy gases necessary to turn turbines 20 and 22. Primary air $A_P$ continues through gas turbine engine 10 whereby it is typically passed through an exhaust nozzle to further produce thrust.

In order to expand the performance range of engine 10, variable stator vanes are used in high pressure compressor 16. For example, HPC 16 comprises variable vanes 32A and 32B, which are stationary and extend radially inward from fan case 23C. Blades 34A and 34B, which rotate with HPC 16 on shaft 28, are positioned adjacent vanes 32A and 32B. Vanes 32A and 32B form part of an array of vane stages arranged circumferentially around the engine centerline between HPC case 23C and an inner diameter vane shroud. Blades 34A and 34B sequentially push primary air $A_P$ past vanes 32A and 32B within HPC 16 to increase the pressure of primary air A. Vanes 32A and 32B rotate about their radial axis to adjust the incidence of the air $A_P$ onto subsequent blades, including blade 34B, during different operation modes, or speeds, of engine 10. In order to ensure optimal operation of engine 10, it is preferable that vanes 32A and 32B are able to rotate freely about their axis within HPC case 23C and the inner diameter vane shroud.

Figure 2:
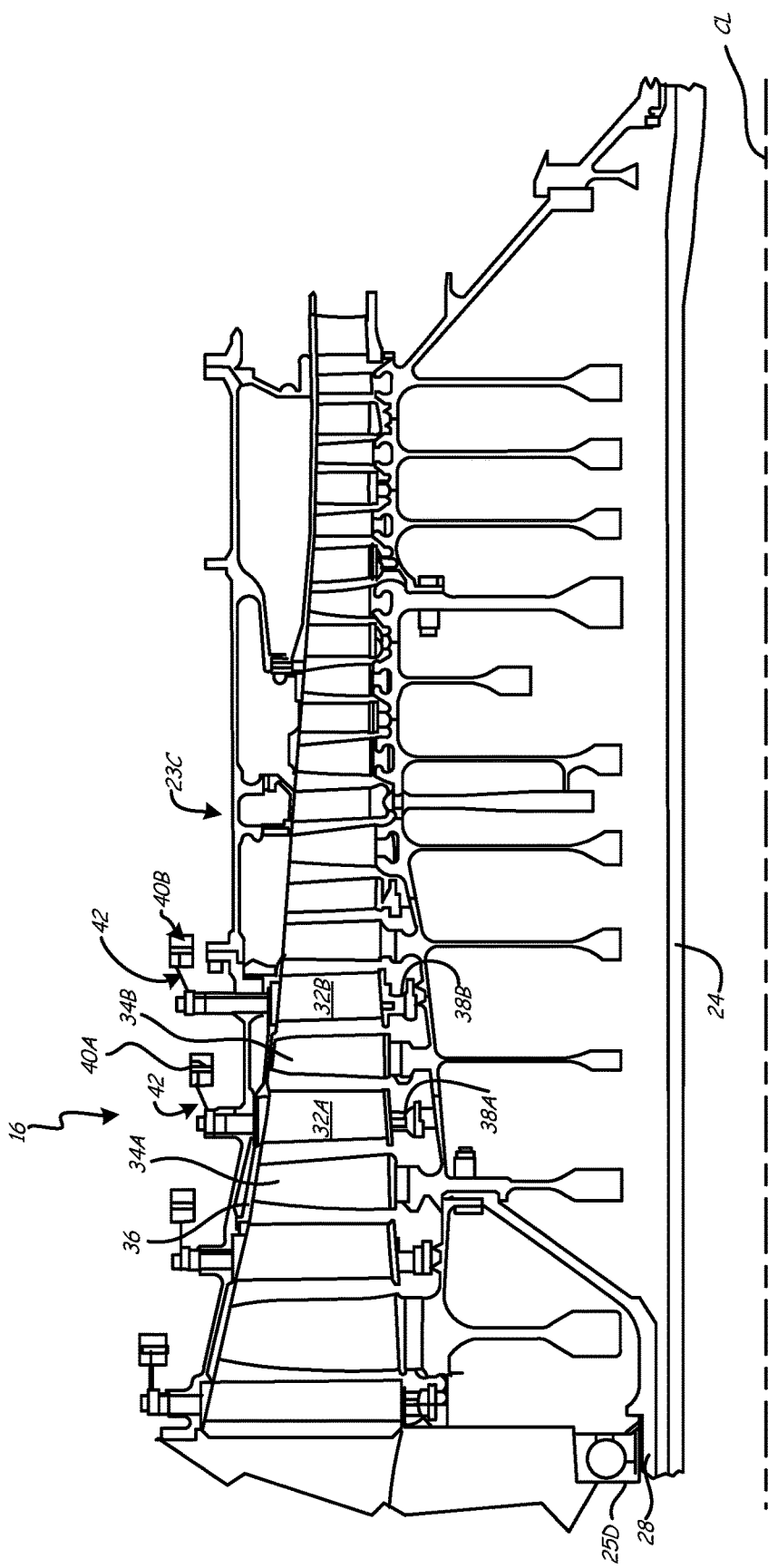
FIG. 2 shows a high pressure compressor section of the gas turbine engine of FIG. 1 showing the interaction between variable stator vanes and a high pressure compressor (HPC) front case.

FIG. 2 shows the sequential arrangement of the various stages of high pressure compressor 16 about centerline CL of gas turbine engine 10. For the embodiment of engine 10 shown, HPC 16 is divided into stages S5 through S15, with LPC 14 of FIG. 1 comprising stages S1 through S4. Vanes 32A and 32B and blades 34A and 34B comprise stages S6 and S7 of HPC 16, respectively. The variable vanes rotate between HPC case 23C and a plurality of inner diameter vane shrouds. Specifically, vanes 32A and 32B rotate between HPC outer shroud 36, which is a component of case 23C, and HPC inner shrouds 38A and 38B, respectively. In order to rotate vanes 32A and 32B within outer shroud 36, vanes 32A and 32B are connected to sync rings 40A and 40B, respectively, through a plurality of sync arms 42. Sync rings 40A and 40B are connected to, for example, a hydraulic actuator to adjust the pitch of vanes 32A and 32B such that airflow through HPC 16 is optimized for different operating levels of engine 10. In order that vanes 32A and 32B rotate freely within outer shroud 36 and inner shrouds 38A and 38B, vanes 32A and 32B include inner and outer diameter trunnions.

Figure 3:
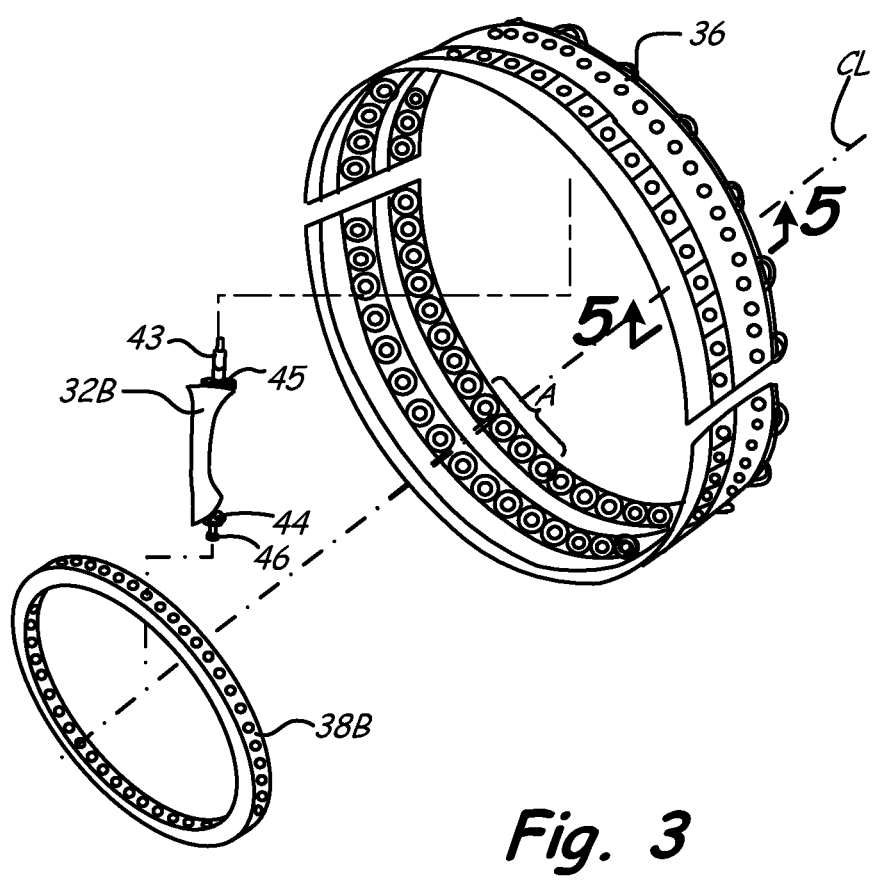
FIG. 3 shows a perspective view of the HPC front case of FIG. 2.

FIG. 3 shows an exploded view of variable vane 32B positioned between outer vane shroud 36 and inner vane shroud 38B. Outer vane shroud 36 and inner vane shroud 38B are positioned concentrically around engine centerline CL at the inner and outer diameters of vane 32B, respectively. Vane shroud 36 comprises a conically shaped body that surrounds stages S6 and S7 of HPC 16, including vanes 32A and 32B and blades 34A and 34B. Vane shroud 36 typically comprises a split-ring construction wherein it is divided into upper and lower halves.

Vane 32B includes outer trunnion 43 and inner trunnion 44 that rotate within variable vane counterbored holes. Using sync ring 40B and sync arms 42 as shown in FIG. 2, vane 32B is rotatable about trunnions 43 and 44 within the counterbored holes in outer vane shroud 36 and inner vane shroud 38B. Additionally, trunnions may include additional features for assisting in true rotation of the variable vanes. For example, vane 32B includes outer diameter hub 45 and inner diameter hub 46 that rotate within the counterbores surrounding the counterbored trunnion holes and help to keep vanes 32B properly aligned. Vane 32A is configured similarly to vane 32B.

As engine 10 progresses into its lifecycle, the counterbores become damaged or worn from use and weather, thus impeding the free rotation of trunnions 43 and 44 within the counterbores, and hubs 45 and 46 against the counterbores. Impediments to the rotation of vanes 32A and 32B can lead to misalignment of the vane pitch along the flow path of engine 10 resulting in sub-optimal operation of HPC 16 and engine 10. Typically, the counterbores begin to show wear after one engine overhaul cycle, with extensive damage appearing typically after 2-3 engine overhaul cycles. In lieu of replacing expensive engine components, such as outer vane shroud 36, after they have worn beyond practical use, the present invention provides a system and method for repairing counterbored holes, principally for variable vanes. Particularly, the repair system and method includes a shrink-fit counterbored hole insert, which can be included in new engine components or can be retrofit into engine components as a fix to damage already sustained. Although hereinafter the invention is described with respect to repairing vane bottom counterbores at the outer diameter end of a high pressure compressor, the repairs can be made to both inner diameter and outer diameter vane shrouds. The repair is particularly well suited to HPC cases, but can also be used for LPC variable vane cases or in any other application using variable vanes.

Figure 4:
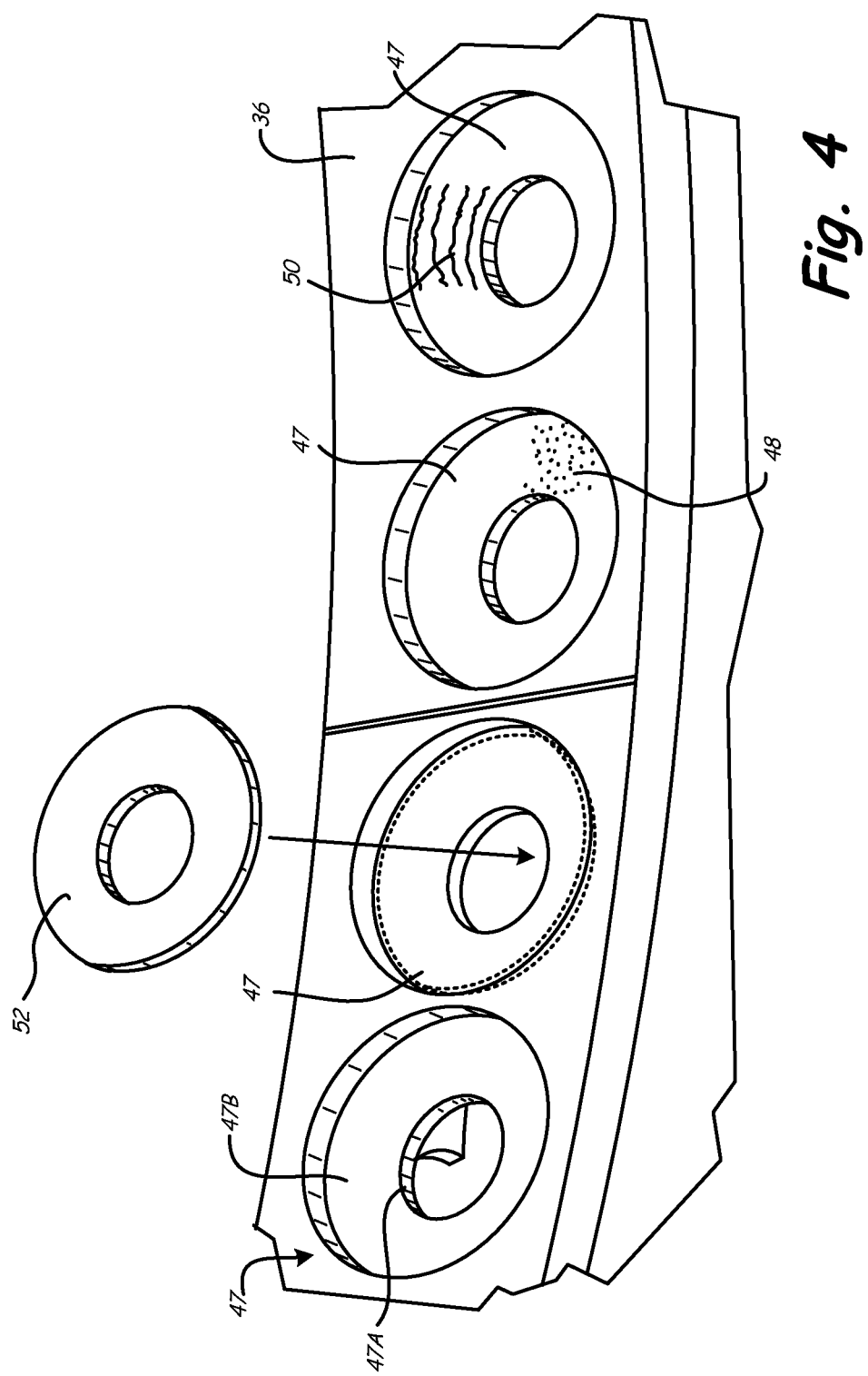
FIG. 4 shows a perspective view of variable vane counterbores in the HPC front case of FIG. 3.

FIG. 4 shows breakout portion A of FIG. 3, showing a perspective view of vane bottom counterbored holes 47, in outer vane shroud 36. Outer vane shroud 36 includes counterbored holes 47 that each receives an outer diameter trunnion from a variable vane, such as trunnion 43 from vane 32B. Counterbored holes 47 comprise hole 47A, which is surrounded by counterbore 47B. Counterbored holes 47 are machined to original design dimensions, free of any pitting, wear or corrosion. However, due to various sources, vane counterbored holes 47 become damaged such that rotation of hub 45 and trunnion 43 is hampered. For example, counterbored holes 47 develop corrosion 48 that arises from harsh operating conditions of engine 10. Corrosion 48 includes pitting or other structural deficiencies of the base material comprising vane shroud 36, which is typically a steel alloy such as an Austenitic steel or another iron-based alloy that builds up oxide layers leading to corrosion.

Corrosion 48 arises from the extreme temperatures at which engine 10 operates and other external factors such as salt-rich operational environments. Counterbored holes 47 also develop scoring 50 that arises from routine rotation of trunnion 43 and hub 45 within counterbored holes 47. Corrosion 48 and scoring 50 prevent free rotation of hub 45 on the surface of the counterbore into which they are inserted. As such counterbored holes 47 are provided with shrink-fit insert 52. Counterbored holes 47 are over-bored such that any damage is removed from the base material of shroud 36. Subsequently, shrink-fit insert 52, having dimensions corresponding to that of the removed over-bore plus nominal additional material, is inserted into counterbored holes 47 to restore shroud 36 to original specifications.

FIG. 5 shows cross section 5-5 of FIG. 3 showing the assembly of shrink-fit insert 52 into outer diameter shroud 36 of HPC case 23C. Outer diameter shroud 36 includes counterbored holes 54A and 54B for receiving trunnions of variable vanes. Counterbored holes 54A and 54B each comprise a trunnion hole 55A and 55B, respectively, extending through shroud 36 and a corresponding counterbore 56A and 56B, respectively, surrounding trunnion holes 55A and 55B, respectively. Outer diameter shroud 36 also includes trenches 57A and 57B against which the outer diameter ends of blades 34A and 34B engage. In various embodiments of shroud 36, trenches 57A and 57B are filled with a plasma-sprayed abradable material. As shown, counterbored hole 54B receives trunnion 43 and hub 45 of vane 32B. In order to facilitate repair of counterbored hole 54A or 54B, shroud 36 is provided with a shrink-fit variable vane hole insert. For example, shrink-fit insert 52, which is an exemplary embodiment of the hole inserts, is used in conjunction with counterbored hole 54B.

Vane shroud 36 is generally a conically shaped cylinder such that it is disposed around engine centerline CL with a sloping orientation. Forward end 58 of shroud 36 is disposed length $L_1$ away from centerline CL, whereas aft end 60 is disposed length $L_2$ away from centerline CL. Length $L_1$ is greater than length $L_2$ such that radially innermost surface 62 of shroud 36 slopes toward centerline CL as shroud 36 extends from forward end 58 to aft end 60. However, since vanes 32A and 32B need to abut shroud 36 on a surface conducive to rotation, counterbores 56A and 56B include flat surfaces 64A and 64B, respectively. Thus, counterbores 56A and 56B are machined perpendicularly to centerline CL into surface 62. As such, counterbores 56A and 56B include walls 66A and 66B that are cylindrically shaped and extend from the generally flat surfaces 64A and 64B to the conically shaped surface 62 such that walls 66A and 66B follow the contour of surface 62. Thus, walls 66A and 66B are tapered in the direction from $L_1$ to $L_2$ with the wall thickness being thicker in the direction of $L_2$ than the direction of $L_1$.

Shroud 36 is typically produced as a single-piece unitary component. Thus, shroud 36 is finished to meet final dimensional tolerances, including the final dimensions of counterbored holes 54A and 54B. Counterbored holes 54A and 54B are typically finished such that they receive trunnion 43 and hub 45 with fairly tight tolerances such that slop is eliminated from the system, depending on design needs. However, due to damage imparted by corrosion and wear discussed above, the dimensions and tolerances of counterbored holes 54A and 54B become altered such that smooth rotation of trunnion 43 and hub 45 is affected. As such, shroud 36 is repaired with shrink-fit insert 52.

Figure 6A:
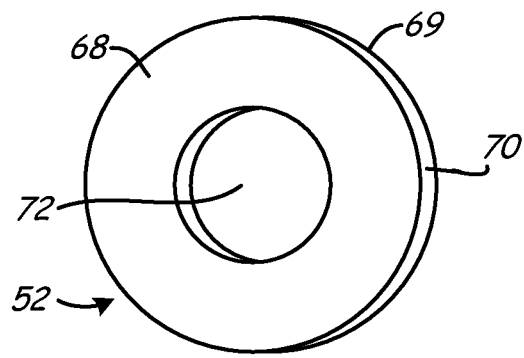
FIG. 6A shows a perspective view of a shrink-fit variable vane hole insert.

FIG. 6A shows a perspective view of shrink-fit insert 52, which is constructed such that counterbored hole 54B can be milled out, or over-bored, to remove the corrosion or damage to counterbored hole 54B. Shrink-fit insert 52 includes top surface 68, bottom surface 69, side wall 70 and aperture 72. Top surface 68 and bottom surface 69 are illustrated as being generally parallel creating a uniform thickness of shrink-fit insert 52.

Figure 6B:
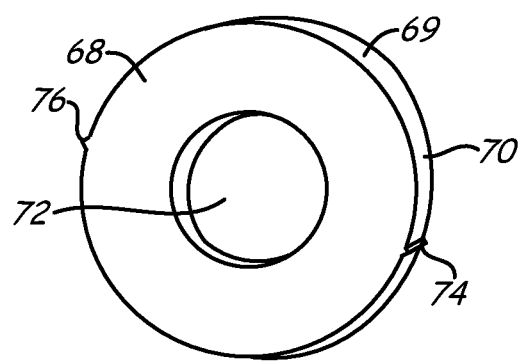
FIG. 6B shows a perspective view of an alternate embodiment of a shrink-fit variable vane hole insert.

In an alternate embodiment illustrated in FIG. 6B, top surface 68 and bottom surface 69 are nonparallel such that wall 70 has a sloping shape that varies around the edge perimeter of shrink-fit insert 52 and inner wall that creates aperture 72. Wall 70 also has two tangs 74 and 76 that may be used to retain shrink-fit insert 52 in place against shroud 36.

Shrink-fit insert 52 may be comprised of any material suitable for withstanding the thermal and mechanical stresses associated with shroud 36 during operation of engine 10. In various embodiments, shrink-fit insert 52 is made from a metallic alloy or from an engineered plastic. Any suitable alloy can be used, however, alloys matching that of shroud 36 are particularly suitable. For example, Austenitic stainless steels, such as 300 series stainless; or nickel materials, such as the Inconel family, would also be suitable materials. Polyetheretherketone (PEEK) materials, such as Sustatec® PEEK as is commercially available from Sustaplast, L.P., Edgewood, N.Y.; or PTFE-based materials, such as Rulon® 945 as is commercially available from St. Gobain Performance Plastics, Valley Forge, Pa. are examples of suitable engineered plastics. Rulon® 957, also available from St. Gobain, is another suitable material. For any material selected desirable properties include heat resistance, low friction and strength. Additionally, corrosion resistant material may be selected to reduce recurrence of corrosion damage. Low-friction materials may be selected such that the variable vanes are better able to rotate. Specifically, the material for shrink-fit insert 52 may be selected to have a lower coefficient of friction than that of the material comprising shroud 36. It is preferable that materials be able to sustain temperatures upwards of 315° C. (600° F.), preferably up to about 371° C. (700° F.), which are temperatures commonly reached around HPC 16. It is also desirable to match the thermal expansion rate of the material of shrink-fit insert 52 with that of the material comprising shroud 36. The qualities for shroud 36 can be selected to match design needs depending on performance parameters of engine 10.

Shrink-fit insert 52 may be created by cutting a pre-sized washer from a sheet of material. The washer may be fabricated utilizing a waterjet cut, laser cut, die cut, or similar process. Multiple washers may be cut from one sheet of material, and the same sheet of material may contain shrink-fit inserts with varying outer diameters to cover wide tolerances on trunnion hole inner diameters. In an alternate embodiment, a custom fit shrink-fit insert may be created from a piece of material by machining, grinding, stoning, sanding or similar process. The shrink-fit insert is specifically sized based on the amount of material removed from shroud 36 to have a desired diameter and thickness or geometry.

Figure 7:
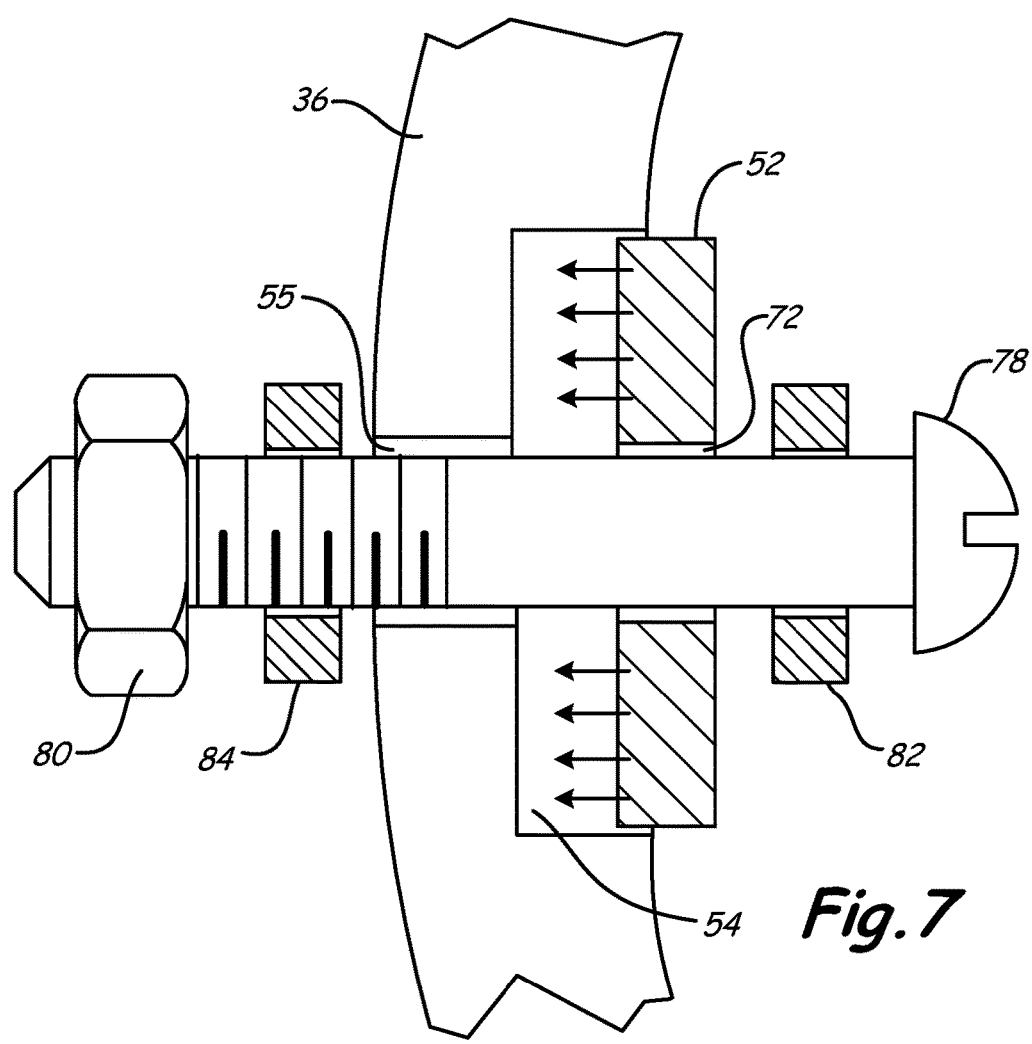
FIG. 7 shows a close-up view of a shrink-fit variable vane hole insert and a variable vane counterbore.

FIG. 7 shows a cross sectional view of shrink-fit insert 52 being installed into counterbored hole 54 of outer diameter vane shroud 36. Counterbored hole 54 is machined into shroud 36 such that it is made to specification as is required by design parameters. As described above, counterbored hole 54 undergoes corrosion and wear such that shroud 36 becomes damaged. The damage associated with the corrosion or wear extends into the base material of shroud 36 a particular depth. As such, counterbored hole 54 is machined out, or over-bored, a particular depth to remove the damaged base material. However, it is not enough to simply remove the damaged material, as any material removal of shroud 36 permits slop in the rotation of vane 32B, which affects the efficiency of HPC 16. A uniform amount of material is removed from counterbored hole 54 such that it can be readily replaced to restore shroud 36 to its original design dimensions. Shrink-fit insert 52 is inserted into the overbored counterbored hole 54 to restore shroud 36 and counterbored hole 54 to their original dimensions. Thus, shrink-fit insert 52 is made to dimensions that are nominally larger than the amount of material removed from counterbored hole 54 in removing the damaged base material.

Shrink-fit insert 52 is secured to shroud 36 through an interference or press fit. Shrink-fit insert 52 is sized to be slightly larger in its outer diameter than counterbored hole 54 inner diameter. For example, the outer diameter of shrink-fit insert 52 should be about 0.050 mm to 0.075 mm larger than the inner diameter of counterbored hole 54. To facilitate assembly, shrink-fit insert 52 may be supercooled to shrink its dimensions. In one embodiment, shrink-fit insert 52 is placed in liquid nitrogen, which provides the supercooling. After shrink-fit insert 52 is supercooled, it is installed in counterbored hole 54 on shroud 36. As illustrated in FIG. 7, the installation may be assisted through application of additional pressure. Fastener 78, such as a bolt or machine screw, is inserted through aperture 72 of shrink-fit insert 52 and trunnion hole 55 of shroud 36. A nut 80 may then be used to tighten the fastener 78 and seat shrink-fit insert 52 in place, along with washers 82 and 84. Shrink-fit insert 52 may then be allowed to warm, thus increasing in size to create the interference fit. Fastener 78, nut 80, and washers 82 and 84 may then be removed, and vane 32 may be reinstalled. In an alternate embodiment, shrink-fit insert 52 may be installed with the use of a mechanical press. Utilizing an insert held in place with an interference fit is preferable to the prior art as no subsequent machining steps are required once shrink-fit insert 52 is seated within shroud 36.

Utilizing a shrink-fit insert 52 allows for an easy method of repair of shroud 36. First, damage to shroud 36 is assessed. The damage is removed by machining or similar material removal process, making sure that the least amount of material (depthwise) possible is removed. Counterbored hole 54 is then measured to obtain its diameter, and shrink-fit insert 52 is selected based on this measurement. In one embodiment, a shrinkage fit washer of proper outer diameter and thickness is pulled from existing stock, with the outer diameter being larger that the diameter of counterbored hole 54. In another embodiment, shrink-fit insert 52 is custom created to contain the proper outer diameter and geometry. Shrink-fit insert 52 is supercooled to reduce the outer diameter so that is can be placed where material has been removed from counterbored hole 54. Shrink-fit insert 52 is placed in position and allowed to expand to secure itself within shroud 36. Placing the shrink-fit insert 52 can be done by manual insertion, or with assistance of tools such as a press or mallet.

The proper wall thickness between trunnion hole bottoms and the case outer diameter is required for proper fire containment. The use of shrink fit washers of material similar to the case and of a material thickness equal to any material removed from the trunnion hole bottom ensures that the fire containment is not compromised. Thus, shrink-fit insert 52 provides an easy, low-cost repair means for repairing variable vane counterbored holes.

Repairs following the present invention can be made at most overhaul or repair shops as the repair can be carried out using commonly found equipment and materials. Expensive or elaborate equipment, such as a plasma-spray booth, is not required. The invention allows for different repairs to be made to cure the same deficiencies such that each shop can perform a repair method within their capabilities. Also, the present invention allows for selective repair of damaged counterbored holes such that an entire part does not need to be replaced or repaired for a single faulty counterbored hole. Alternatively, the repairs may be made preemptively as part of a preventative maintenance program, such as during routine overhaul cycles. Additionally, the repair process is repeatable without further degrading the properties of the base material of shroud 36, as a counterbored hole repaired according to the present invention could be again subsequently repaired at a later engine overhaul cycle using the same method.

Although the present invention has been described with reference to preferred embodiments, workers skilled in the art will recognize that changes may be made in form and detail without departing from the spirit and scope of the invention.

The invention claimed is:

1. A method for repairing a damaged counterbore in a variable vane shroud, the method comprising:
   removing a layer of base material from the vane shroud adjacent to the counterbore such that a damaged portion of the counterbore is removed;
   supercooling an insert prior to installation, the shroud having a size slightly larger than that corresponding to the layer of base material removed from the shroud; and
   placing the insert into the area of removed material such that the counterbore is restored to pre-damaged dimensions upon installation of the insert.

2. The method of claim 1 wherein the step of removing the layer of base material comprises machining the counterbore.

3. The method of claim 1 wherein the layer of removed base material comprises removing a cylindrically shaped portion of the base material.

4. The method of claim 1 wherein the insert has outer dimensions that create an interference fit with the counterbore.

5. The method of claim 1 wherein the insert is a pre-existing part.

6. The method of claim 1 where in the insert is a custom made part.

7. The method of claim 1 wherein supercooling the insert further comprises:
   placing the insert in liquid nitrogen.

8. The method of claim 1 further comprising:
   securing the supercooled insert in place.

9. The method of claim 8 wherein securing the insert is done with a threaded fastener and washers.

10. The method of claim 1 wherein the insert contains tangs on an outer perimeter to secure the insert in place with respect to the shroud.

11. The method of claim 1 wherein the insert is comprised of a material having a lower coefficient of friction than the base material of the vane shroud.

12. The method of claim 11 wherein the insert comprises at least one of the following materials: a metallic alloy and a plastic.

13. A method for repairing a damaged variable vane shroud, the method comprising:
   removing a layer of base material from the vane shroud adjacent to a counterbore such that a damaged portion of the counterbore is removed;

measuring the amount of material removed;

creating an insert based on the measurements of the amount of removed material;

supercooling the insert; and installing the insert adjacent the vane shroud, wherein the insert returns the vane shroud to its design parameters.

14. The method of claim 13 wherein installing the insert comprises:

securing the insert with a threaded fastener and washers.

15. The method of claim 13 wherein the insert has outer dimensions that creates an interference fit with the counter-bore.

16. The method of claim 13 wherein supercooling the insert further comprises:

placing the insert in liquid nitrogen.

\* \* \* \* \*